UNITED STATES PATENT OFFICE.

ROBERT N. RIDDLE, OF UWCHLAND, PENNSYLVANIA, ASSIGNOR TO THE WARNER CHEMICAL COMPANY, OF CARTERET, NEW JERSEY, A CORPORATION OF NEW JERSEY.

SOLVENT FOR NITRO-DERIVATIVES OF CARBOHYDRATES.

No. 797,373.     Specification of Letters Patent.     Patented Aug. 15, 1905.

Application filed June 13, 1904. Serial No. 212,337.

*To all whom it may concern:*

Be it known that I, ROBERT N. RIDDLE, a citizen of the United States, and a resident of Uwchland, Chester county, Pennsylvania, have invented a certain new and useful Solvent or Colloiding Agent for the Nitro-Derivatives of the Carbohydrate Group, &c., of which the following is a specification.

My invention consists in the employment of acetate of phenyl as a solvent or colloiding agent for the nitro-derivatives of the carbohydrate group, &c., which acetate of phenyl I have ascertained by experiment possesses the property of acting as a ready solvent or colloiding agent for the class of nitrocelluloses, for nitro-starch, and in general for the nitro-derivatives of the carbohydrate group. Acetate of phenyl besides possessing the properties of being insoluble in water and uninflammable and a perfect solvent for the substances mentioned when used in smaller amounts than required as a solvent gelatinizes or colloids these substances very completely, so that perfectly transparent jellies are obtained, a matter of great importance in connection with the manufacture of smokeless powder.

The process I employ in preparing the acetate of phenyl is as follows, the proportions having been ascertained to be satisfactory by experiment: I take four hundred grams of phenol and put it in a flask provided with a return-condenser and fitted with a separatory funnel. The phenol is then heated by any convenient means to 160° Fahrenheit, and then three hundred and thirty-two grams of acetyl chlorid is slowly run in. The mixture is then washed with a solution of carbonate of soda and is ready for use.

In order to gelatinize or colloid the class of nitrocelluloses, I have ascertained that the following proportions produce a favorable result. For instance, I take one gram of nitrocellulose of the kind known as "pyroxylin" or "soluble guncotton" and treat it with three cubic centimeters of acetate of phenyl, the result being that the pyroxylin is perfectly gelatinized.

In order to gelatinize or colloid nitro-starch, I take one gram of explosive nitro-starch of eleven and four-tenths per cent. nitrogen strength and add thereto one and three-tenths cubic centimeters of the acetate of phenyl, the result being complete gelatinization.

It is a well-recognized fact that all forms of nitrocelluloses and nitro-starch dissolve freely in an excess of those solvents in contact with smaller quantities of which they form colloids directly, and hence the experiments above recited indicate perfect solvent power of the acetate of phenyl for the nitrocelluloses and nitro-starch and in general for the nitro-derivatives of the carbohydrate group. This I have verified by experiment and find that both nitrocelluloses and nitro-starch go into perfectly clear thin solution in the acetate of phenyl when the latter is used in sufficient amount.

I have also discovered that the acetate of phenyl mixes readily in clear solution with methyl, ethyl, and amyl alcohols with acetone and with amyl acetate; and my invention also extends to the use of mixed solvent solutions in which acetate of phenyl is an ingredient, there being cases in which it may be thought advisable to use it thus in a mixture for the solvent or gelatinizing effect on the nitrocelluloses and nitro-starch.

The obvious advantages of the use of the acetate of phenyl as a solvent and gelatinizing agent when applied to the nitrocelluloses and nitro-starch as we have above described are its uninflammability, its slight volatility, (acetate of phenyl boiling at 193° centigrade,) and its freedom from disagreeable or penetrating odor.

I have also discovered that acetate of phenyl is a ready solvent for fats, gums, resins, lacquers, varnish, &c.

Having thus described the nature and object of my invention, what I claim as new, and desire to secure by Letters Patent of the United States, is—

1. As an improvement in the art of dissolving or colloiding substances, dissolving them in acetate of phenyl or bringing them into the colloid state by the addition of acetate of phenyl, substantially as described.

2. As an improvement in the art of dissolving or colloiding the nitro-derivatives of the carbohydrate group, dissolving said nitro-derivatives in acetate of phenyl or bringing them into the colloid state by the addition of acetate of phenyl, substantially as described.

3. As an improvement in the art of dissolving or colloiding nitrocelluloses, dissolving the nitrocelluloses in acetate of phenyl or bringing them into the colloid state by the addition of acetate of phenyl, substantially as described.

4. As an improvement in the art of dissolving or colloiding pyroxylin, dissolving the pyroxylin in acetate of phenyl or bringing it into the colloid state by the addition of acetate of phenyl, substantially as described.

5. As an improvement in the art of dissolving or colloiding substances, dissolving said substances in a liquid mixture containing acetate of phenyl as an ingredient or bringing the same into the colloid state by the addition of a liquid mixture containing acetate of phenyl as an ingredient, substantially as described.

6. A composition of matter comprising acetate of phenyl and nitrocelluloses, substantially as described.

7. A composition of matter comprising acetate of phenyl and a nitro-derivative of the carbohydrate group, substantially as described.

In witness whereof I have hereunto signed my name in the presence of two subscribing witnesses.

ROBERT N. RIDDLE.

Witnesses:
A. E. SUPLEE,
T. FRANK WOODSIDE.